(12) United States Patent
Ross et al.

(10) Patent No.: US 8,755,534 B2
(45) Date of Patent: Jun. 17, 2014

(54) AUDIO DIRECTION-DISTANCE DETECTION

(75) Inventors: Marcus E. Ross, North Las Vegas, NV (US); Scott A. Sugden, NewburyPark, CA (US)

(73) Assignee: Sound Services, LLC, St. Francis, WI (US)

(*) Notice: Subject to any disclaimer, the term of this patent is extended or adjusted under 35 U.S.C. 154(b) by 0 days.

(21) Appl. No.: 13/323,771

(22) Filed: Dec. 12, 2011

(65) Prior Publication Data

US 2012/0082318 A1 Apr. 5, 2012

Related U.S. Application Data

(63) Continuation-in-part of application No. 12/001,385, filed on Dec. 11, 2007, now Pat. No. 8,077,896.

(60) Provisional application No. 60/869,628, filed on Dec. 12, 2006.

(51) Int. Cl.
*H04R 29/00* (2006.01)

(52) U.S. Cl.
USPC ............................................. 381/59; 381/332

(58) Field of Classification Search
USPC ......... 381/332, 381, 59, 58, 77, 79, 388, 124, 381/338
See application file for complete search history.

(56) References Cited

U.S. PATENT DOCUMENTS

| 8,077,896 B2* | 12/2011 | Ross et al. | 381/332 |
| 2005/0035246 A1* | 2/2005 | Coleman | 248/131 |

* cited by examiner

*Primary Examiner* — Roy Potter
(74) *Attorney, Agent, or Firm* — Bradley K. DeSandro; Desandro Law Group PLLC

(57) ABSTRACT

A laser device, finder of range(s), and an inclinometer are used to figure a sound producing device's position adjustment (s). Laser beam(s) of the laser device and the inclinometer characterize direction(s) of sound produced by the sound producing device. The laser beam(s) can be one or more colors or patterns each characterizing the general direction of sound produced by the sound producing device. A stadium can have many speaker housings each including a speaker, the laser, range finder and the inclinometer. Each speaker housing is mounted on, and remotely adjustable with respect to, an structural member as to the general direction of sound emitted from the speaker housing into the area for stadium seating. The inclinometer's output can be rendered by a monitor seen by an audio engineer who also uses the laser beam's direction to make adjustments to the position of the speaker housing relative to its structural member.

19 Claims, 4 Drawing Sheets

AUDIO DIRECTION-DISTANCE DETECTION

CROSS REFERENCE TO RELATED APPLICATIONS

This application is a continuation-in-part of U.S. patent application Ser. No. 12/001,385, titled "Laser Inclinometer Audio Direction," filed on Dec. 11, 2007, now U.S. Pat. No. 8,077,896, which claims priority to US Provisional Application Ser. No. 60/869,628, titled "Audio System Inclinometer Apparatus, System and Method", filed on Dec. 12, 2006, both of which are incorporated herein by reference.

TECHNICAL FIELD

The present invention relates generally to the field of audio related stage and theatrical systems, and more specifically to the field of directing sound from a speaker in an audio related stage or theatrical system.

BACKGROUND

A speaker in an audio system is generally non-directional in the projection of sound produced by the speaker. To direct the sound towards an area, a housing for the speaker is pointed in a direction of the area to which the sound is to be directed.

Tolerance for poor acoustics for an event in a performing arts venue is particular low. As such, an audio engineer has a keen appreciation that in a theatre, stadium, or auditorium (e.g.; a "concert venue"), there are many areas to which sound is to be uniformly directed so as to achieve for each audience member an acoustically esthetic listening experience.

A particular problem for the audio engineer responsible for overall acoustics in a concert venue is whether sound is being directed to the proper audience locations, given the many speakers in the concert venue. It would be an advance in the art to concert venue with a capability to direct, at a numerically verifiable angle, the output of sound from each speaker within the concert venue towards a precise location therein.

SUMMARY

A laser is used with an inclinometer to make one or more adjustments to a position of a sound producing device. Both the laser beam of the laser and an output from the inclinometer characterize a general direction of sound produced by the sound producing device. The inclinometer will preferably be mounted and calibrated to ensure that its output characterizes the general direction of sound produced by the sound producing device—either by an interpretive output and/or by deduction from its output. The laser will be similarly mounted such that the direction of its laser beam will characterize the general direction of sound produced by the sound producing device.

DESCRIPTION

Figure 1:
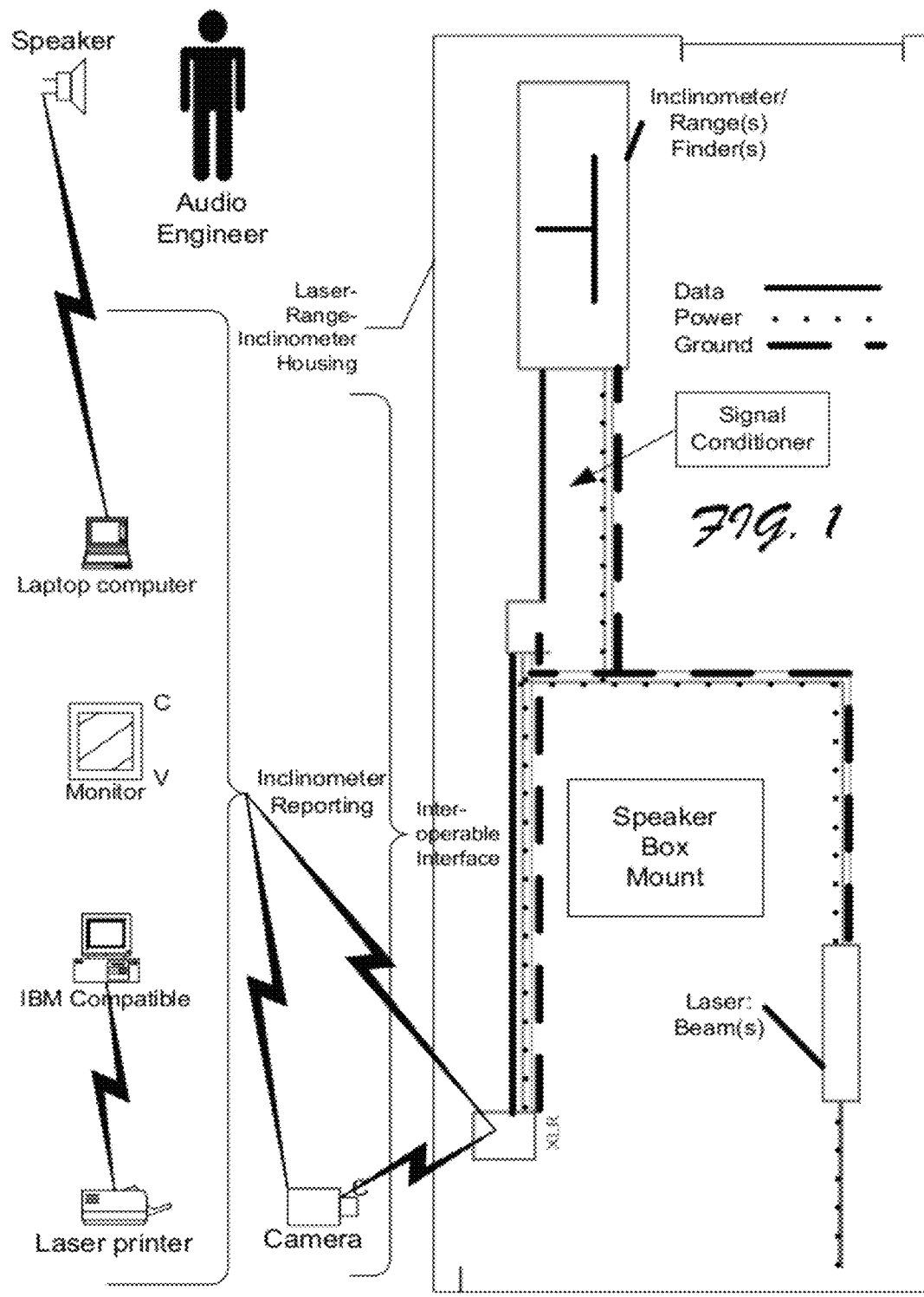
FIG. 1 is an exemplary implementation of a audio system having a laser inclinometer in which an audio engineer can focus the direction of sound emitted from each of a plurality of speakers enclosed in respective housings, where the granularity of the focus is accomplished by the audio engineer's movement of the enclosure in consultation with an audio and/or visual report from an inclinometer secured relative to the enclosure as to the direction of a laser emitted from a housing that also includes the inclinometer.

In one implementation, a speaker housing is disclosed. The speaker housing includes a speaker and a laser mounted in the speaker housing to emit a laser beam in the general direction of sound emitted from the speaker housing. Also included is a means for detecting a position of the speaker housing, such as relative to one or more axes. Each such axis will be relative to a structural member on which the speaker housing is mounted. For instance, three (3) such axes can be three (3) dimensions expressed by the vertical (height or 'y' axis), the horizon (length of the 'x' axis); and width (depth of the 'z' axis). Means for taking a horizontal azimuth measurement, in one implementation, adds the ability to measure the horizontal angle of a loudspeaker or array.

The function of detecting a position of the speaker housing can be accomplished by an instrument for measuring angles of slope (or tilt), elevation or inclination with respect to gravity of a speaker, a speaker housing, or a general direction of sound produced by a speaker or by a speaker housing. Such a position detecting means can be, by way of example and not by way of limitation, a bubble level, a tilt meter, a tilt indicator, a slope alert, a slope gauge, a gradient meter, a gradiometer, a level gauge, a level meter, declinometer, a pitch & roll indicator, an inclinometer, or a combination of the foregoing. Preferably, the position detection function will be accomplished by use of an inclinometer. A device that accomplishes the function of electronically outputting information characterizing the detected position of the speaker housing can be used to direct the information to a renderer for rendering. In one implementation, an interface to the inclinometer receives an electrical signal characterizing the detected position and outputs the information characterizing the position to a renderer for rendering. Alternatively, the electronically outputting information can also characterize a measure of the change of angle relative to the direction of gravitational pull, which information can be further used to deduce the general direction of sound.

The laser will preferably emit one or more visible light beams. Each beam can be a solid beam but can also be one or more colors each indicating a direction of the sound emitted from the speaker housing relative to one or more axes. Alternatively, the laser can be a device that produces one or more patterns of light each indicating a direction of the sound emitted from the speaker housing relative to one or more axes. The appearance and directions of the beam(s) of light provide an audio engineer with an ability to seen the directions of the sound emitted from the speaker housing, thus being a type of filter set for the laser aiming device. Stated otherwise, the lasers mounted on the speaker housing each emit a laser beam defining the general area to which sound emitted from the speaker housing is being directed into an area.

In one implementation, the speaker housing can be in communication with an audible diagnostic reporter for emitting an audible report indicating a direction of the sound emitted from the speaker housing relative to one or more axes, where the reporter receives information about the detected position of the speaker housing. In such an implementation, the speaker in the speaker housing can be used to produce the audible report.

In yet another implementation, an orientation report is rendered to containing information characterizing the general direction of sound rendered by a speaker that is adjustably mounted upon a structural member. The structural member also has mounted thereon a laser that emits a laser beam in the general direction of sound rendered by the speaker, and an apparatus that detects and outputs the information characterizing the general direction of sound rendered by the speaker. By way of example, the apparatus can be an inclinometer, and the information output by the inclinometer can be used to by a renderer (e.g.; a printer, a video monitor, a television, a speaker, and combinations thereof) to render the orientation report. An audio engineer can use the laser beam and the orientation report to make one or more adjustments each of which will change the position of the speaker relative to the structural member on which the speaking is mounted and thus the general direction of sound rendered by a speaker. Note also that each such adjustment can be made by a remotely operated control to adjust the position of the speaker relative to the structural member upon which the speaker is mounted. Each such adjustment be in one, two, or three dimensions (e.g.; up to three (3) different axes). Note also that the structural member can also support a mounting of an audible diagnostic reporter for emitting an audible report characterizing the general direction of sound rendered by the speaker.

In yet another implementation, the speaker housing can include, or be in communication with, a range finding laser measuring device, by which a determination can be made of the distance between the speaker(s) and a target coverage area.

FIG. 1 shows a system level block diagram featuring a laser inclinometer housing. Each laser inclinometer housing can be mounted stationary relative to a speaker housing. Preferably, the laser inclinometer housing will be mounted to the speaker housing such that the laser in the laser inclinometer housing will emit a laser beam in the direction of sound being emitted. By observing the direction of the laser beam, an audio engineer will be able to see the direction of the sound being emitted from the speaking housing. For instance, the direction of the laser beam may give the audio engineer an understanding that the speaker housing must be adjusted in its position in order to properly direct sound to a particular seating area in a theater, stadium, or other performance venue. The inclinometer in the laser inclinometer housing will emit a visual and/or audible report as to the angle of the speaker housing relative to a vertical axis (or one or more other axes of orientation) to confirm to the audio engineer the adjustment of the position of the speaker housing. As such, the laser beam and the inclinometer report will allow the audio engineer to make adjustments of fine granularity to the direction of sound being emitted from each speaker housing.

One or more laser inclinometers are mounted in a speaker housing. A small hole can be formed in the housing of the laser inclinometer as an exit for a laser beam emitted from the laser. A mounting device of the implementer's choice can be used to attach the housing for the laser and the inclinometer to a speaker enclosure, box, or housing. The laser inclinometer is mounted with rigging to a pole, an upright or other structural member within the concert venue such that the speaker enclosure, box, or housing can be adjusted in position relative to the pole, upright or other structural member. Any such adjustment will also adjust the direction of the sound emitted from the speaker enclosure, box, or housing.

The inclinometer can be either analog or digital, and its report can be used by an audio engineer, either live or robotic, in order to aim each speaker enclosure, box, or housing to which the laser inclinometer housing or apparatus is mounted. The outside dimensions of the laser inclinometer housing are determined by the type of speaker enclosure, box, or housing to which the laser inclinometer housing is to be mounted. The laser inclinometer housing should be mounted in stationary position relative to the speaker enclosure, box, or housing. The laser inclinometer housing will preferably have a laser of suitable power for the dimensions of the concert or performance venue (e.g.; five (5) milliwatts). An analog and/or digital inclinometer will also be included in the laser inclinometer housing, the output of which will be used to measure the angular position of the speaker enclosure, box, or housing relative to the pole, upright or other structural member. This measurement will be used to ensure a proper installation for each speaker enclosure, box, or housing which form the speaker system for the concert or performance venue.

The laser inclinometer housing can be in wired and/or wireless communication (e.g.; via a three (3) wire cable) with a visual and/or audible reporting device (e.g.; a computer monitor and/or an liquid crystal display screen, a printer, either or both) to report the angle of the speaker enclosure, box, or housing relative to the pole, upright or other structural member to which the speaker housing is mounted as detected by the inclinometer. As such, the detected and reported angle will correspond to the angle of the direction of the sound being emitted by the speaker enclosure, box, or housing relative to the pole, upright or other structural member.

Preferably, a laser inclinometer apparatus will be mounted to a speaker enclosure, box, or housing. Wired communication capabilities will be provided to the laser inclinometer via an interface to transmit an angle of the speaker housing that has been detected by the inclinometer. The transmitted angle can be reported to a means for visually and/or audibly rendering the angle.

Figure 2:
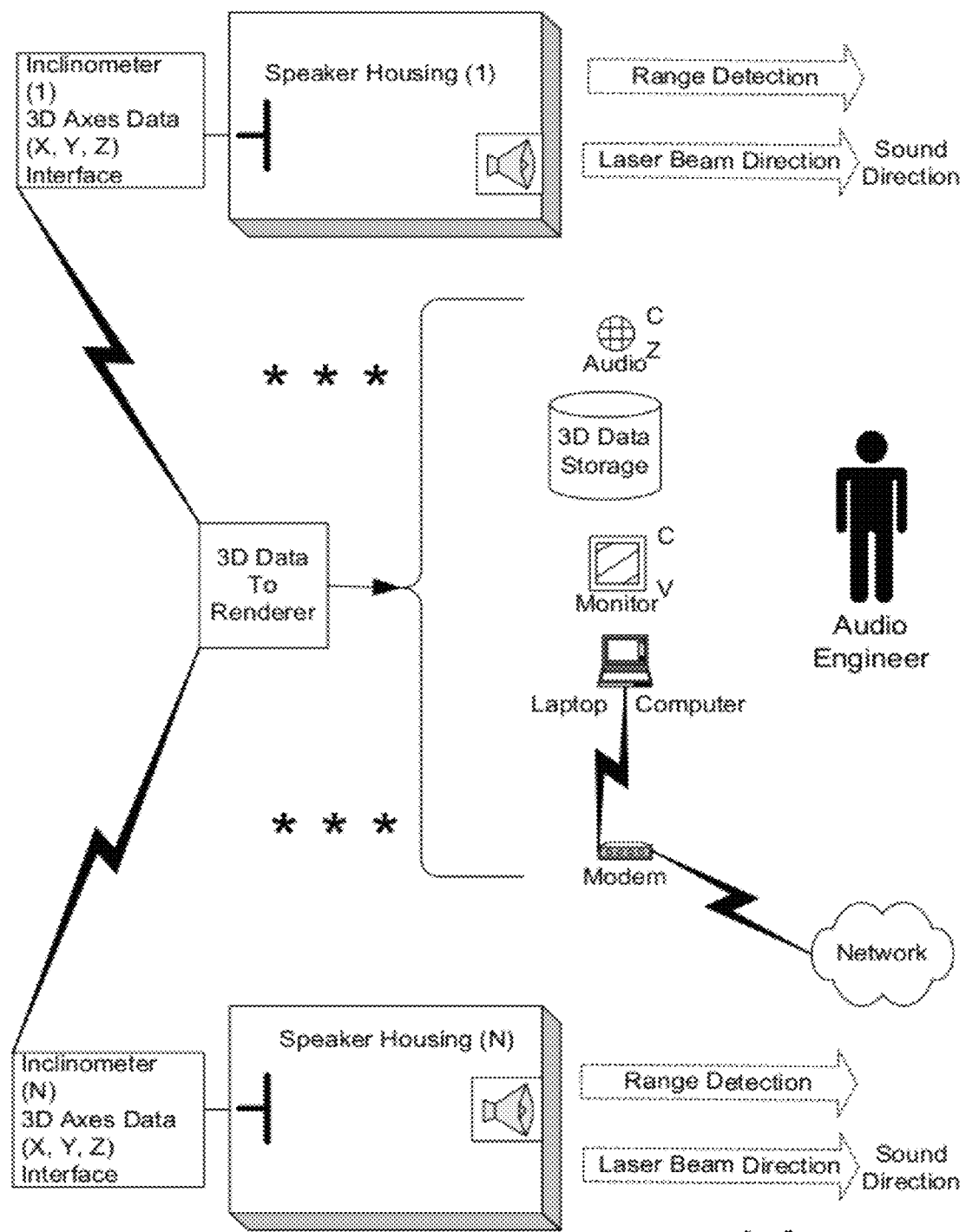
FIG. 2 depicts another exemplary implementation illustrated by a block level diagram showing a plurality of speaker housings each of which include a laser inclinometer and each being mounted with means for a comprehensive directional adjustability of the sound output by a speaker in the speaker housing, where an output from each inclinometer characteristic of the direction of the sound output by the speaker in the speaker housing as to the can be rendered at a plurality of different renderers of choice.

FIG. 2 shows an exemplary system of speaker housing each including a laser and an inclinometer, where both the laser and the inclinometer indicate the direction of sound output by the speaker housing. The output of each inclinometer can be output at different kinds of renderers at the choice of an audio engineer.

Figure 3:
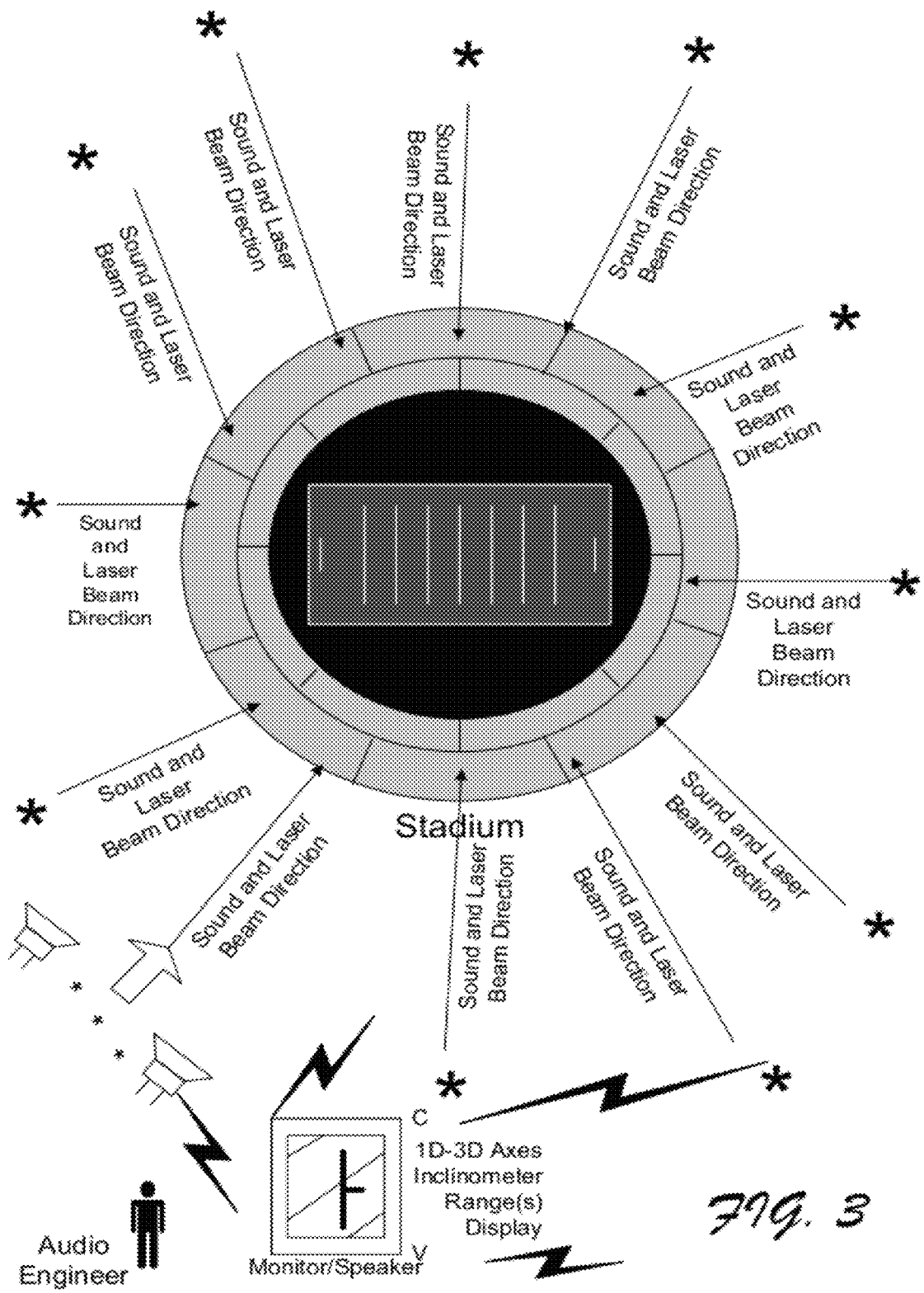
FIGS. 3-4 depict respective exemplary implementations of an audio system for a stadium intended to stage an event as a performance venue attended by an audience, wherein each of a plurality of speaker housings has a laser inclinometer mounted stationary relative to the housing, the housing is adjustable as to the direction of sound emitted there from relative to the performance venue, the laser inclinometer emits one or more laser beams of one or more colors and/or patterns to indicate the direction and/or other sound attribute of the emitted sound, the inclinometer provides an audio engineer a visual and/or audible report as to one or more angles of the speaker housing relative to the performance venue (e.g.; relative to the horizon and/or the vertical), and wherein one or more of the inclinometer reports are simultaneously and/or serially communicated to the audio engineer.
Figure 4:
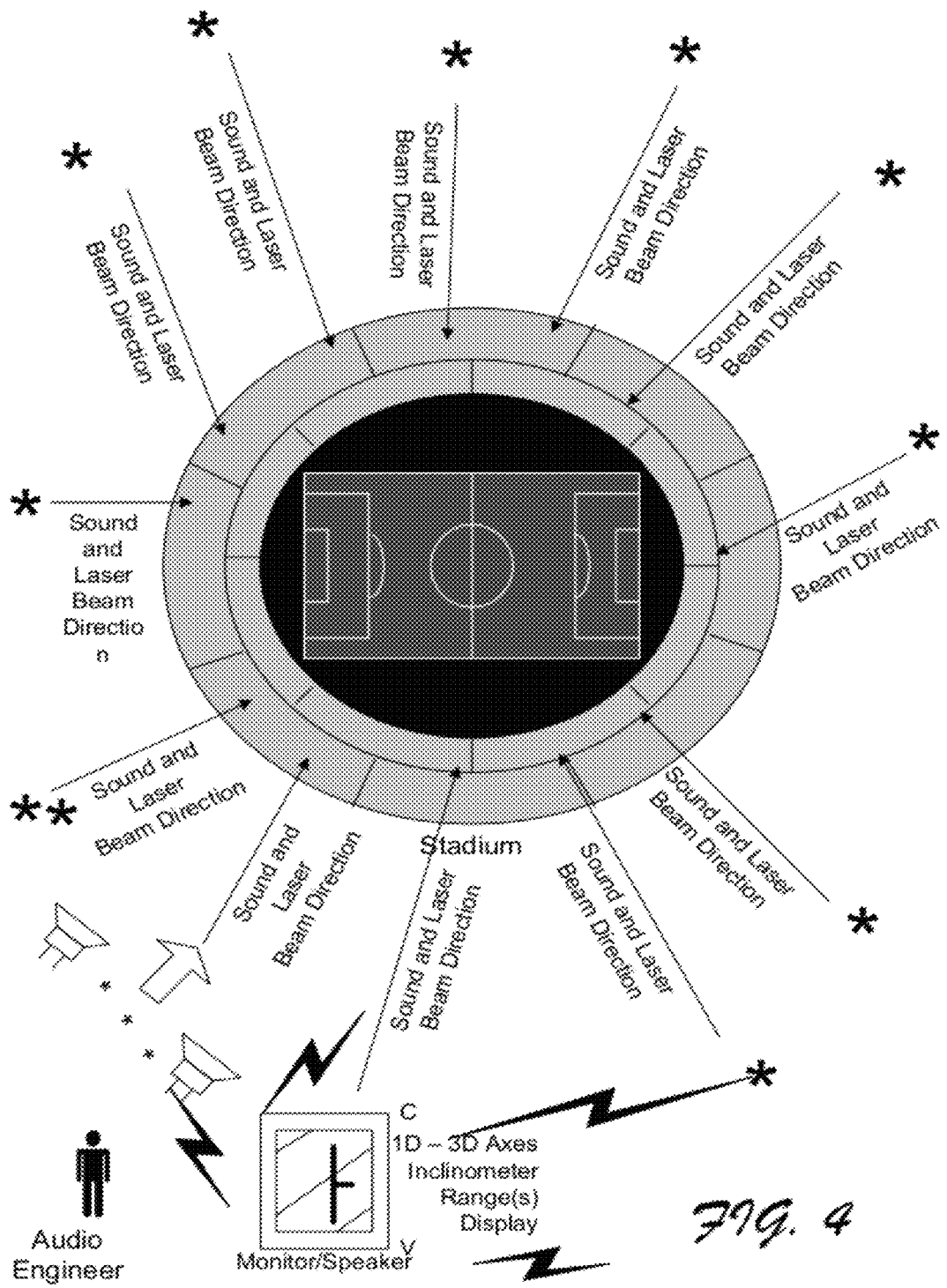

Various audio stadium systems for concert venues are illustrated in FIGS. 3-4 and described below. While each audio system is for a stadium having stadium seating, those of ordinary skill in the relevant arts will recognize the advantageous use of a laser inclinometer in conjunction with a speaker housing, where multiple such speaker housings project sound to respective locations within a planar seating area. In any event, the planar area and the stadium are both intended to stage an event. The event is intended to be attended by an audience. Thus, the stadium is a performance or concert venue for the audio system.

Each audio system includes a plurality of speaker enclosure, box, or housings. Each speaker enclosure, box, or housing is mounted on and stationary relative to a pole, upright or other structural member. Each such speaker enclosure, box, or housing has a laser inclinometer housing mounted stationary relative thereto. Each such speaker enclosure, box, or housing has an adjustable position upon its pole, upright or other structural member as to the direction of sound emitted there from relative to the performance venue. The laser inclinometer emits there from one or more laser beams of one or more colors and/or patterns. Each such color and/or pattern serve to visually indicate to an audio engineer and/or audio system implementer the direction and/or other sound attribute of the emitted from the speaker enclosure, box, or housing.

The inclinometer, via output to the interface, provides a signal carrying information about the position of the speaker enclosure, box, or housing relative to its pole, upright or other structural member. This information can be visually and/or audible rendered for the benefit of an audio engineer. Seeing the visual and/or audible report of the one or more angles of the speaker housing relative to the performance venue (e.g.; relative to the horizon and/or the vertical) will enable the audio engineer, either live or robotic, to make adjustments to the position, and thus the direction of the sound, for each speaker enclosure, box, or housing. One or more of the inclinometer reports can be simultaneously and/or serially communicated to the audio engineer. Using the reports, the audio engineer can make sound direction adjustments of a fine granularity to each of one or more speaker housings. Any such adjustment can be made manually and/or with a motor remotely operated by the audio engineer.

In still another implementation, the inclinometer will preferably be mounted and calibrated to ensure that its output characterizes a general direction of sound produced by a corresponding sound producing device. Thus, the electrical output of the inclinometer can be readily interpreted to convey or otherwise characterize the general direction of sound produced by the sound producing device. Alternatively, a deduction can be made from the output of the inclinometer as to the general direction of sound produced by the sound producing device. For instance, the electrical output of the inclinometer may characterize of position of a speaker housing relative to a structural member upon which the speaker housing is mounted. Nevertheless, a calibration of the inclinometer relative to the speaker housing and its structural member will enable a deduction from the output of the inclinometer as to the general direction of sound produced by the sound producing device. A similar calibration can be done for the laser relative to its mounting in the speaker housing such that the direction of its laser beam will characterize the general direction of sound produced by the sound producing device.

Either separately or together, the audio engineer, either live or robotic, can use the following information to effect a desirable position of each speaker enclosure, box, or housing relative to a pole, upright or other structural member upon which it is mounted so as to appropriately steer the direction of the sound being emitted from the speaker enclosure, box, or housing:

(i) the direction of the laser beam emitted from the laser inclinometer as visually observed by the audio engineer;
(ii) the spot within the concert venue that is illuminated by the terminus of the laser beam within the concert venue as visually observed by the audio engineer, where the laser beam is emitted from the laser inclinometer mounted within the speaker enclosure, box, or housing;
(iii) a report rendered, audibly and/or visually, to the audio engineer, where report contains information received via an interface to the laser inclinometer, where the interface transmits to the report renderer an angle in one or more axes of the speaker housing that has been detected by the inclinometer, and where the report renderer can be a printer, a video monitor, a sound speaker, or a combination thereof.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A stadium comprising:
    an area for stadium seating;
    one or more structural members each having mounted thereon a speaker housing adjustable in position relative to the structural member, each speaker housing including:
        a speaker;
        one or more lasers mounted on the speaker housing to each emit a laser beam and collectively define the general area to which sound emitted from the speaker housing is being directed into the area for stadium seating;
        means for detecting the position of the speaker housing relative to the structural member;
        means for outputting information characterizing the position;
        means, remotely operated, for adjusting the position of the speaker housing in a plurality of axes relative to the structural member upon which the speaker housing is mounted;
        means for reporting an audible diagnostic report indicating a direction of the sound emitted from the speaker housing relative to one or more axes; and
    a renderer for the information characterizing the position.

2. The stadium as defined in claim 1, wherein the renderer is selected from the group consisting of a printer, a video monitor, a television, a speaker, and combinations thereof.

3. The stadium as defined in claim 1, wherein each said speaker housing further comprises one or more devices each operable to determine the distance between the speaker housing and the area for stadium seating.

4. A method to adjust sound within an area for stadium seating in a stadium, the method comprising:
    receiving a plurality of orientation reports each containing information characterizing the position of a speaker housing adjustably mounted upon a structural member in the stadium, wherein the speaker housing includes:
        a speaker; and
        a plurality of lasers mounted on the speaker housing to each emit a laser beam and collectively define the general area to which sound emitted from the speaker housing is being directed into the area for stadium seating;
        an inclinometer, mounted on the speaker housing, to:
            detect a position of the speaker housing relative to one or more axes; and
            output the information characterizing the position of the speaker housing;

receiving a plurality of location reports each respectively corresponding to a location within the stadium that is illuminated by the terminus of the laser beam from the laser within a respective said speaker housing;

associating each said location report with a corresponding said orientation report; and using one or more said associations to make one or more adjustments, wherein each said adjustment changes the position of one said speaker housing relative to a corresponding said structural member in the stadium on which the speaking housing is mounted.

5. The method as defined in claim 4, wherein each said adjustment is made by a remotely operated control to adjust the position of one said speaker housing relative to the structural member upon which the speaker housing is mounted.

6. The method as defined in claim 4, wherein each said adjustment is made in up to three (3) different axes.

7. The method as defined in claim 4, wherein receiving the plurality of orientation reports comprises one or more renderers each rendering one said orientation report, wherein each said renderer is selected from the group consisting of a printer, a video monitor, a television, a speaker, and combinations thereof.

8. The method as defined in claim 4, wherein the inclinometer further comprises an audible diagnostic reporter for emitting an audible report indicating a direction of the sound emitted from the speaker housing relative to one or more axes.

9. The method as defined in claim 4, wherein each said speaker housing further comprises one or more devices each operable to determine the distance between the speaker housing and the area for stadium seating.

10. The method as defined in claim 9, wherein each said received location report further includes a distance to the location within the stadium that is illuminated by the terminus of the laser beam from the laser within a respective said speaker housing.

11. A speaker housing comprising:
a speaker;
a plurality of lasers mounted in the speaker housing each emitting a laser beam to visually collectively define a general area into which sound emitted from the speaker housing is being directed;
a device operable to detect a position of the speaker housing relative to one or more axes;
a device operable to electronically output information characterizing the position; and
one or more devices each operable to determine a distance between the speaker housing and a hearing destination.

12. The speaker housing as defined in claim 11, wherein each said laser beam makes an emission selected from the group consisting of:
one or more colors each indicating a direction of the sound emitted from the speaker housing relative to one or more axes; and
one or more patterns of light each indicating a direction of the sound emitted from the speaker housing relative to one or more axes.

13. The speaker housing as defined in claim 11, further comprising a device operable to adjust a position of the direction of the sound emitted from the speaker housing relative to a plurality of axes.

14. The speaker housing as defined in claim 11, further comprising a device operable to render a report indicating a direction of the sound emitted from the speaker housing relative to one or more axes.

15. The speaker housing as defined in claim 14, wherein the device operable to render the report is selected from the group consisting of a printer, a video monitor, a television, a speaker, and combinations thereof.

16. The speaker housing as defined in claim 11, wherein the hearing destination comprises an area for audience seating.

17. The speaker housing as defined in claim 16, further comprising a device operable to render a report indicating each said distance between the speaker housing and the area for audience seating.

18. The speaker housing as defined in claim 11, further comprising:
a device operable to adjust a position of the direction of the sound emitted from the speaker housing relative to a plurality of axes;
and
a device operable to render a report indicating:
the direction of the sound emitted from the speaker housing relative to one or more axes; and
the distance between the speaker housing and the hearing destination.

19. The speaker housing as defined in claim 18, wherein each said device operable to render the report is selected from the group consisting of a printer, a video monitor, a television, a speaker, and combinations thereof.

* * * * *